(12) United States Patent
Chen et al.

(10) Patent No.: US 10,169,725 B2
(45) Date of Patent: Jan. 1, 2019

(54) CHANGE-REQUEST ANALYSIS

(71) Applicant: International Business Machines Corporation, Armonk, NY (US)

(72) Inventors: Hao Chen, Beijing (CN); Claudio Cozzi, Foster City, CA (US); Ya B. Dang, Beijing (CN); Howard M. Hess, Winnetka, IL (US); Steven M. Kagan, Burr Ridge, IL (US); Feng Li, Beijing (CN); Shao C. Li, Beijing (CN); Xin Zhou, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/497,457

(22) Filed: Sep. 26, 2014

(65) Prior Publication Data
US 2015/0121381 A1 Apr. 30, 2015

(30) Foreign Application Priority Data
Oct. 31, 2013 (CN) .......................... 2013 1 0532615

(51) Int. Cl.
*G06F 9/44* (2018.01)
*G06Q 10/06* (2012.01)
*G06F 8/70* (2018.01)

(52) U.S. Cl.
CPC .............. *G06Q 10/06* (2013.01); *G06F 8/70* (2013.01); *G06F 2209/5017* (2013.01)

(58) Field of Classification Search
None
See application file for complete search history.

(56) References Cited

U.S. PATENT DOCUMENTS 7,103,871 B1  9/2006 Kirkpatrick et al.
7,860,737 B2  12/2010 Jordan et al.
(Continued)

FOREIGN PATENT DOCUMENTS

CN  102404377  4/2012
CN  102662621  9/2012
(Continued)

OTHER PUBLICATIONS

Office Action (dated Aug. 27, 2015) for U.S. Appl. No. 14/453,685, filed Aug. 7, 2014.
(Continued)

*Primary Examiner* — Lewis A Bullock, Jr.
*Assistant Examiner* — Melissa A Headly
(74) *Attorney, Agent, or Firm* — Schmeiser, Olsen & Watts, LLP; Mark Vallone

(57) ABSTRACT

A method and associated systems for analyzing a change request of a project that involves an IT system, where IT system contains IT artifacts that have predefined relationships. One or more processors obtain a change request; use information contained in the change request to select an applicable decomposition agent; use information in the selected decomposition agent to decompose the change request into a set of component sub-change requests; correlate at least one of the sub-change requests with one of the IT artifacts; and display the sub-change requests. In alternate implementations, selecting the applicable decomposition agent may require additional user input.

20 Claims, 8 Drawing Sheets

(56) References Cited

U.S. PATENT DOCUMENTS

| | | | |
|---|---|---|---|
| 7,921,027 | B2 | 4/2011 | Jordan et al. |
| 8,006,222 | B2 | 8/2011 | Ruhe |
| 8,191,044 | B1 | 5/2012 | Berlik et al. |
| 8,209,211 | B2 | 6/2012 | Engle et al. |
| 8,306,841 | B2 | 11/2012 | Clarke et al. |
| 2005/0216879 | A1* | 9/2005 | Ruhe .................. G06Q 10/10 717/101 |
| 2007/0006122 | A1* | 1/2007 | Bailey .................. G06F 8/61 717/101 |
| 2007/0214208 | A1* | 9/2007 | Balachandran ........ G06Q 10/10 709/201 |
| 2008/0028005 | A1 | 1/2008 | Cass et al. |
| 2008/0046876 | A1 | 2/2008 | Clemm et al. |
| 2008/0147470 | A1* | 6/2008 | Johri .................. G06Q 10/06 379/265.11 |
| 2008/0148248 | A1 | 6/2008 | Volkmer et al. |
| 2008/0270210 | A1 | 10/2008 | Kratschmer et al. |
| 2010/0010856 | A1 | 1/2010 | Chua et al. |
| 2011/0125544 | A1 | 5/2011 | Shtub |
| 2011/0125553 | A1 | 5/2011 | Mazzoleni et al. |
| 2011/0295754 | A1 | 12/2011 | Mohamed |
| 2013/0104133 | A1 | 4/2013 | Keller et al. |

FOREIGN PATENT DOCUMENTS

| | | |
|---|---|---|
| EP | 2 199 901 | 6/2010 |
| EP | 2305508 | 6/2011 |
| WO | WO9712320 | 4/1997 |
| WO | WO2011031328 | 3/2011 |

OTHER PUBLICATIONS

Amendment (dated Nov. 19, 2015) for U.S. Appl. No. 14/453,685, filed Aug. 7, 2014.
Amandeep et al., Intelligent Support for Software Release Planning, Appeard in: Proceedings PROFES'2004, LNCS Vo. 3009, pp. 248-262
Ruhe et al., Hybrid Intelligence in Software Release Planning, International Journal of Hybrid Intelligent Systems 1, (2004), pp. 99-110.
Anda et al., Estimating Software Development Effort based on Use Cases—Experiences from Industry, Oct. 2001, '01: Proceedings of the 4th International Conference on The Unified Modeling Language, Modeling Languages, Concepts, and Tools, 18 pages.
Apiwattanapong, et al., Efficient and Precise Dynamic Impact Analysis Using Execute-After Sequences, ICSE'05, May 15-21, 2005, copyright ACM 1-58113-963-2/05/0005, pp. 432-441.
Par Carlshamre, Release Planning in Market-Driven Software Product Development: Provoking an Understanding, Requirements Eng (2002) 7:139-151, copyright 2002 Springer-Verlag London Limited.
Ceccarelli, et al., An Electric Approach for Change Impact Analysis, ICSE'10, May 2-8, 2010, Cape Town, South Africa, Copyright 2010 ACM 978-1-60558-719-6/10/05, 4 pages.
Holmes et al., Approximate Structural Context Matching: An Approach to Recommend Relevant Examples, IEEE Transactions on Software Engineering, vol. 32, No. 12, Dec. 2006, pp. 952-970.
Authors: Microsoft, Rajagopalan, C.S., Software Tool for Analyzing Changes, Publication Date: Jun. 4, 2008, IP.com No. IPCOM000171321D, 9 pages.
Authors: Disclosed Anonymously, A Method and System for Release Planning, IP.com No. IPCOM000210356D, Publication: Aug. 31, 2011, 7 pages.
Li et al., A Business Process-driven Approach for Requirements Dependency Analysis, Sep. 2012, BPM'12: Proceedings of the 10th international conference on Business Process Management, 16 pages.
Capers Jones, Software Project Management Practices: Failure Versus Success, Project Management, Oct. 2004, www.stsc.hill.af.mil, 5 pages.
Kama et al., Extending Change Impact Analysis Approach for Change Effort Estimation in the Software Development Phase, ISBN: 978-1-61804-179-1, 2013, 7 pages.
Kersten et al., Using Task Context to Improve Programmer Productivity, SIGSOFT'06/FSE-14, Nov. 5-11, 2006, copyright ACM 2006 1-59593-468-5/06/0011, 11 pages.
Law et al., Whole Program Path-Based Dynamic Impact Analysis, Proceedings of the 25th International Conference on Software Engineering (ICSE '03), 0270-52573/03, copyright 2003 IEEE, 11 pages.
Steffen Lehnert, A Taxonomy for Software Change Impact Analysis, IWPSE-EVOL'11. Sep. 5-6, 2011, copyright 2011 ACM 978-1-4503-0848-9/11/09, 10 pages.
Li et al., A survey of code-based change impact analysis techniques, Software Testing, Verification and Reliability, Softw. Test. Verif. Reliab. (2012), Published online in Wiley Online Library (wileyonlinelibrary.com).DOI: 10.1002/stvr.1475, 34 pages.
David Longstreet, Fundamentals of Function Point Analysis, Copyright Longstreet Consulting, Inc. 2005, www.SoftwareMetrics.Com, 9 pages.
Loyall et al., Impact Analysis and Change Management for Avionics Software, CH36015-97/0000-0740 copyright 1997 IEEE, pp. 740-747.
Roberto Meli, Measuring Change Requests to support effective project management practices, ESCOM-Metrics 2001, London, United Kingdom, Apr. 2001, 10 pages.
Rekha Narayan, Scope Change Management: Keeping Projects on Track, Technology Executives Club, IT Management-Scope Change Management, Retrieved from Internet May 22, 2014, URL: http://www.technologyexecutivesclub.com/Articles/managennent/artScopeChangeManagement.php, 2 pages.
James Steven O'Neal, Analyzing the Impact of Changing Software Requirements: A Traceability-Based Methodology, Clemson University, Dec. 2003, 104 pages.
James Davies, PRWeb, Accept Software Corporation Announces New Accept Planner 3 Release, copyright 2005, 3 pages.
Przepiora et al., A Hybrid Release Planning Method and its Empirical Justification, ESEM'12, Sep. 19-20, 2012, copyright 2012 ACM 978-1-4503-1056-7/12/09, pp. 115-118.
Regnell et al., Exploring Software Product Management Decision Problems with Constraint Solving-Opportunities for Prioritization and Release Planning, 978-1-4577-1147-3/11 copyright 2011 IEEE, pp. 47-56.
Ruhe et al., Quantitative Studies in Software Release Planning under Risk and Resource Constraints, Proceedings of the 2003 International Symposium on Empirical Software Engineering (ISESE'03), 0-7695-2002-2/03 copyright 2003 IEEE, 10 pages.
Carlshamre et al., An Industrial Survey of Requirements Interdependencies in Software Product Release Planning, 1090-705X/01 copyright 2001, IEEE, pp. 84-91.
Siba et al., Conceptual Dependency Based Requirements Clustering for Component Selection, International Journal of Advanced Research in Computer Engineering & Technology (IJARCET) vol. 2, Issue 4, Apr. 2013, pp. 1518-1522.
Ye et al., Reuse-Conductive Development Environments, Automated Software Engineering, 12, pp. 199-235, 2005.
Ochoa et al., Estimating Software Projects Based on Negotiation, Journal of Universal Computer Science, vol. 15, No. 9 (2009), pp. 1812-1832.
Dam et al., An agent-oriented approach to change propagation in software maintenance, Auton Agent Multi-Agent Syst (2011) 23:384-452, DOI 10.1007/s10458-010-9163-0, Published online: Jan. 1, 2011.
Dam et al., Evaluating an Agent-Oriented Approach for Change Propagation, M. Luck and J.J. Gomez-Sanz (Eds.): AOSE 2008, LNCS 5386, pp. 159-172, 2009.
Patent application for U.S. Appl. No. 14/453,685, filed Aug. 7, 2014.
Bohner et al., (Book) Software Change Impact Analysis, 1996, IEEE Computer Society Press, Los Alamitos, CA.
Boehm et al., (Book) Software Engineering Economics, Englewood Cliffs, NJ: Prentice-Hall, 1981, ISBN 0-13-822122-7.

(56) References Cited

OTHER PUBLICATIONS

Boehm et al., (Book) Software Cost Estimation With Cocomo II, Englewood Cliffs, NJ: Prentice-Hall, 2000, ISBN 0-13-026692-2.
Linstone et al., (Book) The Delphi Method: Techniques and Applications, Reading, Mass: Adison-Wesley, ISBN 9780201042948.
RCE (Mar. 24, 2016) for U.S. Appl. No. 14/453,685, filed Aug. 7, 2014.
Final Office Action (dated Feb. 12, 2016) for U.S. Appl. No. 14/453,685, filed Aug. 7, 2014.
Chinese OA; 201310532615.4; Mar. 27, 2017; 12 pages.

* cited by examiner

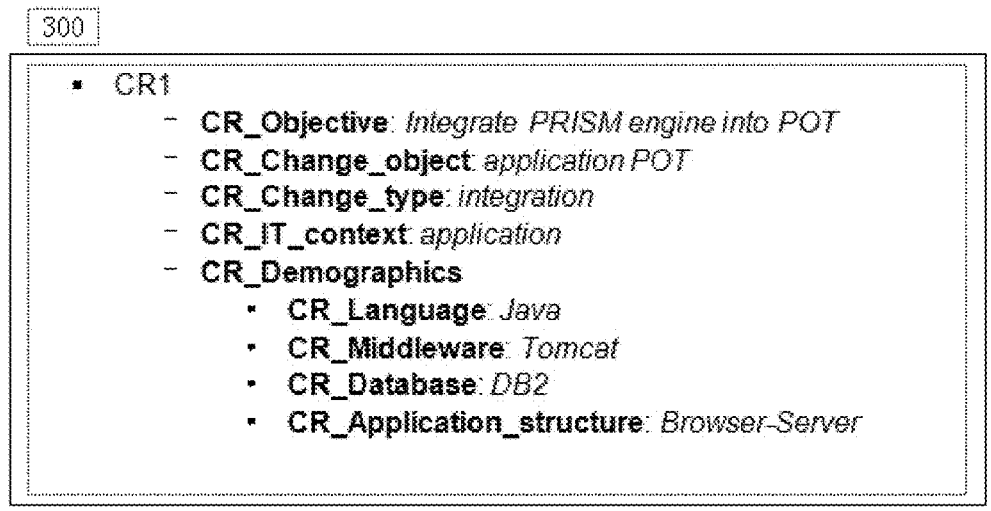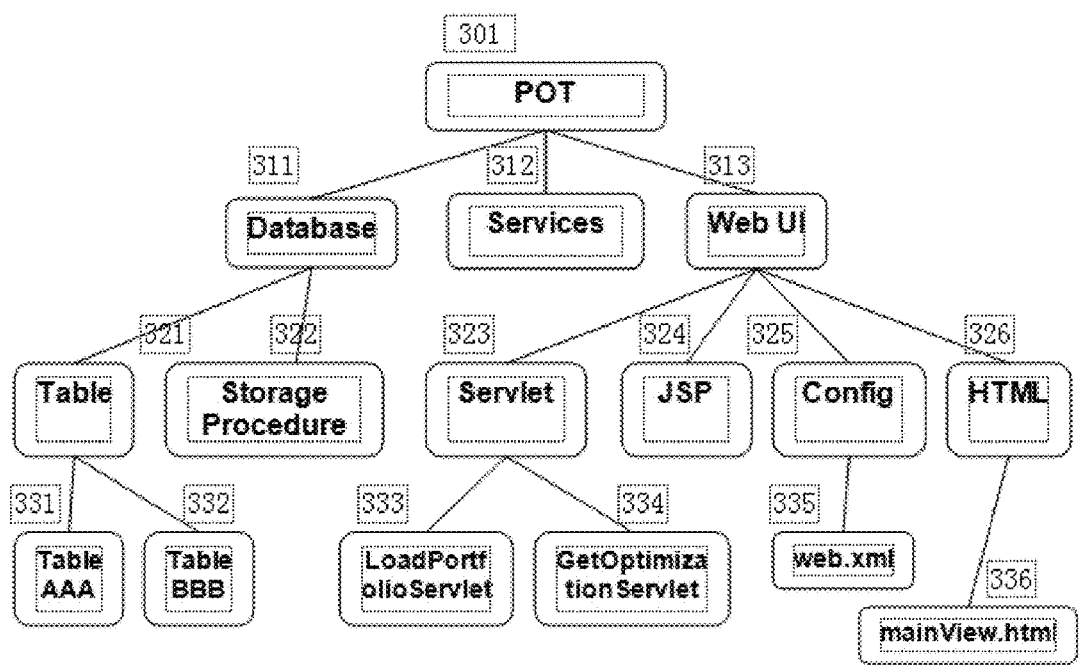
FIG. 3

- *AGENT_001*
- AGT_Change_object: *application*
- AGT_Change_type: *integration*
- AGT_Demographics:
    - AGT_Language: *Java*
    - AGT_Application_structure: *Browser-Server*
    - AGT_Database: *relational database*
- AGT_Actions:
    - AGT_Action_ID: *ACT_001_01*
        - AGT_Action_pattern: *change the data table to support integration scenario*
        - AGT_IT_context: *Database*
        - AGT_Impact_scope: *null*
        - AGT_Sequence_No.: *0*
        - AGT_Dependencies: *null*
        - AGT_Assigned_agent_ID: *null*
    - AGT_Action_ID: *ACT_001_02*
        - AGT_Action_pattern: *change to provide REST APIs*
        - AGT_IT_context: *Services*
        - AGT_Impact_scope: *null*
        - AGT_Sequence_No.: *1*
        - AGT_Dependencies: *null*
        - AGT_Assigned_agent_ID: *null*
    - AGT_Action_ID: *ACT_001_03*
        - AGT_Action_pattern: *change front-end to invoke REST APIs*
        - AGT_IT_context: *Web UI*
        - AGT_Impact_scope: *null*
        - AGT_Sequence_No.: *2*
        - AGT_Dependencies: *null*
        - AGT_Assigned_agent_ID: *null*

FIG. 4

- *AGENT_007*
- AGT_Change_object: *web UI*
- AGT_Change_type: *modify*
- AGT_Demographics
  - AGT_Language: *Java*
  - AGT_Application_structure: *Browser-Server*

- AGT_Actions:
  - AGT_Action_ID: *ACT_007_01*
    - AGT_Action_pattern: *delete old servlets*
    - AGT_IT_context: *Servlet*
    - AGT_Impact_scope: *application*
    - AGT_Sequence_No.: *0*
    - AGT_AGT_Dependencies: *null*
    - AGT_AGT_Assigned_agent_ID: *null*

- AGT_Action_ID: *ACT_007_02*
    - AGT_Action_pattern: *add JSP files for data retrieving via REST APIs*
    - AGT_IT_context: *JSP*
    - AGT_Impact_scope: *null*
    - AGT_Sequence_No.: *1*
    - AGT_Dependencies: *null*
    - AGT_Assigned_agent_ID: *null*

- AGT_Action ID: *ACT_007_03*
    - AGT_Action_pattern: *modify existing presentation web pages*
    - AGT_IT_context: *JSP, HTML*
    - AGT_Impact_scope: *null*
    - AGT_Sequence_No.: *2*
    - AGT_Dependencies: *null*
    - AGT_Assigned_agent_ID: *null*

CHANGE-REQUEST ANALYSIS

TECHNICAL FIELD

The present invention relates to handling a change request related to a configuration of a computer application or to a requirement of a computer-related project.

BACKGROUND

Change request analysis is a part of project development that may comprise decomposing a change request into component tasks or "sub-change requests." The process of decomposing a change request into sub-change requests may require identifying relationships among sub-change requests and details of the IT system subject to the change request.

Change request analysis often requires expert knowledge. But a complex business system may comprise so many interdependent IT artifacts that an expert may be unable to account for all details of the system. Therefore, a change-request analysis procedure may be labor-intensive, time-consuming, and error-prone.

There is thus a need for computer-aided tools capable of automating a change request analysis procedure and, in particular, that are capable of decomposing a change request into sub-change requests.

BRIEF SUMMARY

A first embodiment of the present invention provides a method for analyzing a change request of a project involving an IT system, wherein the IT system comprising a plurality of IT artifacts, the method comprising:

one or more processors receiving a change request that requests a performance of a task associated with the project, wherein the change request comprises values of a set of parameters that each describe a characteristic of the change request;

the one or more processors selecting an applicable decomposition agent from a plurality of decomposition agents as a function of information comprised by the change request, wherein the applicable decomposition agent contains information necessary for the one or more processors to decompose the received change request into a set of sub-requests;

the one or more processors generating the set of sub-change requests as a function of the information contained by the applicable decomposition agent; and the one or more processors identifying a correlation between at least one sub-change request of the plurality of sub-change requests and one IT artifact of the plurality of IT artifacts.

A second embodiment of the present invention provides a computer program product, comprising a computer-readable hardware storage device having a computer-readable program code stored therein, said program code configured to be executed by a processor of a computer system to implement a method for analyzing a change request of a project involving an IT system, wherein the IT system comprising a plurality of IT artifacts, the method comprising:

the one or more processors receiving a change request that requests a performance of a task associated with the project, wherein the change request comprises values of a set of parameters that each describe a characteristic of the change request;

the one or more processors selecting an applicable decomposition agent from a plurality of decomposition agents as a function of information comprised by the change request, wherein the applicable decomposition agent contains information necessary for the one or more processors to decompose the received change request into a set of sub-requests;

the one or more processors generating the set of sub-change requests as a function of the information contained by the applicable decomposition agent; and the one or more processors identifying a correlation between at least one sub-change request of the plurality of sub-change requests and one IT artifact of the plurality of IT artifacts.

A third embodiment of the present invention provides a computer system comprising a processor, a memory coupled to said processor, and a computer-readable hardware storage device coupled to said processor, said storage device containing program code configured to be run by said processor via the memory to implement a method for analyzing a change request of a project involving an IT system, wherein the IT system comprising a plurality of IT artifacts, the method comprising:

one or more processors receiving a change request that requests a performance of a task associated with the project, wherein the change request comprises values of a set of parameters that each describe a characteristic of the change request;

the one or more processors selecting an applicable decomposition agent from a plurality of decomposition agents as a function of information comprised by the change request, wherein the applicable decomposition agent contains information necessary for the one or more processors to decompose the received change request into a set of sub-requests;

the one or more processors generating the set of sub-change requests as a function of the information contained by the applicable decomposition agent; and the one or more processors identifying a correlation between at least one sub-change request of the plurality of sub-change requests and one IT artifact of the plurality of IT artifacts.

BRIEF DESCRIPTION OF THE DRAWINGS

FIG. 3 shows an example of a change request according to an embodiment of the invention.

FIG. 4 shows an example of a decomposition agent according to an embodiment of the invention.

FIG. 6 shows a decomposing agent according to another embodiment of the invention.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
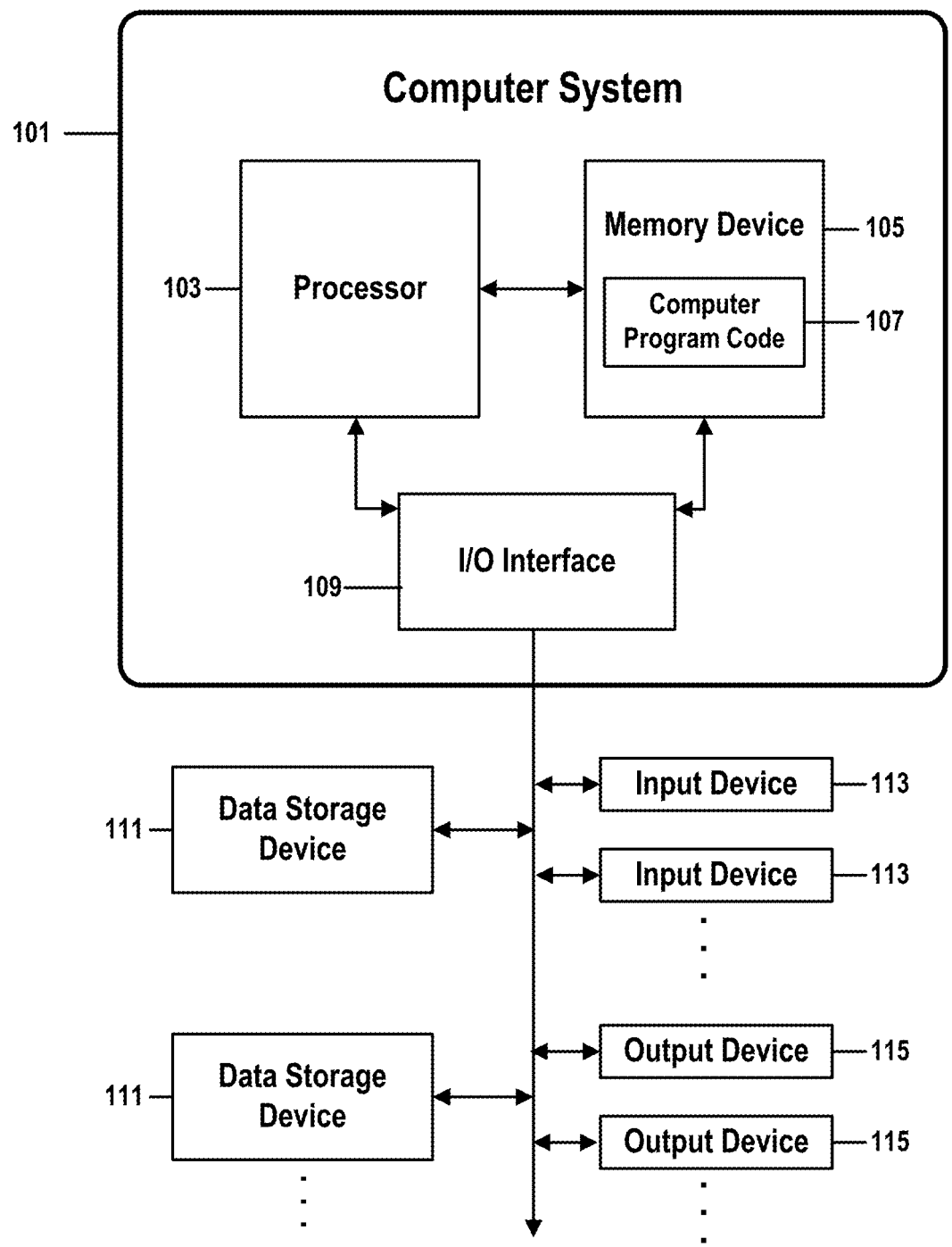
FIG. 1 shows the structure of a computer system and computer program code that may be used to implement a method for change-request analysis in accordance with embodiments of the present invention.

FIG. 1 shows a structure of a computer system and computer program code that may be used to implement a method for change-request analysis in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for change-request analysis in accordance with embodiments of the present invention, and may implement other embodiments described in this specification, including the methods illustrated in FIGS. 1-8. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for change-request analysis.

Any of the components of the present invention could be created, integrated, hosted, maintained, deployed, managed, serviced, supported, etc. by a service provider who offers to facilitate a method for change-request analysis. Thus the present invention discloses a process for deploying or integrating computing infrastructure, comprising integrating computer-readable code into the computer system 101, wherein the code in combination with the computer system 101 is capable of performing a method for change-request analysis.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for change-request analysis may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for change-request analysis is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Before describing various embodiments of the invention, some terms used in the specification will be explained.

The term "change request" means a request to make a change to an existing project, for example, "integrating the PRISM software computational engine into the POT Portfolio Optimization Tool application."

The term "change request decomposition" refers to a division of a change request into a lower level of multiple sub-change requests. As will be appreciated by project-management professionals, sub-change requests are change requests at lower levels than the level of an original request. The purpose of decomposing a change request is to make the task for satisfying the change request more specific and easier to implement. A sub-change request may be further broken down into an even lower level of sub-change requests.

"IT System" is a general term that refers to an implementation of an information technology for a purpose of supporting business operations, which may comprise one or more applications each consisting of a variety of IT artifacts.

The term "IT artifact" refers to one of the elements from which an application is made, including, but not limited to, a code file, a configuration file, a dataset, a functional interface, and combinations thereof.

The term "IT context" refers to a specific environment of IT artifacts, which may comprise one or more specific IT artifacts, or a class of IT artifacts.

Figure 2:
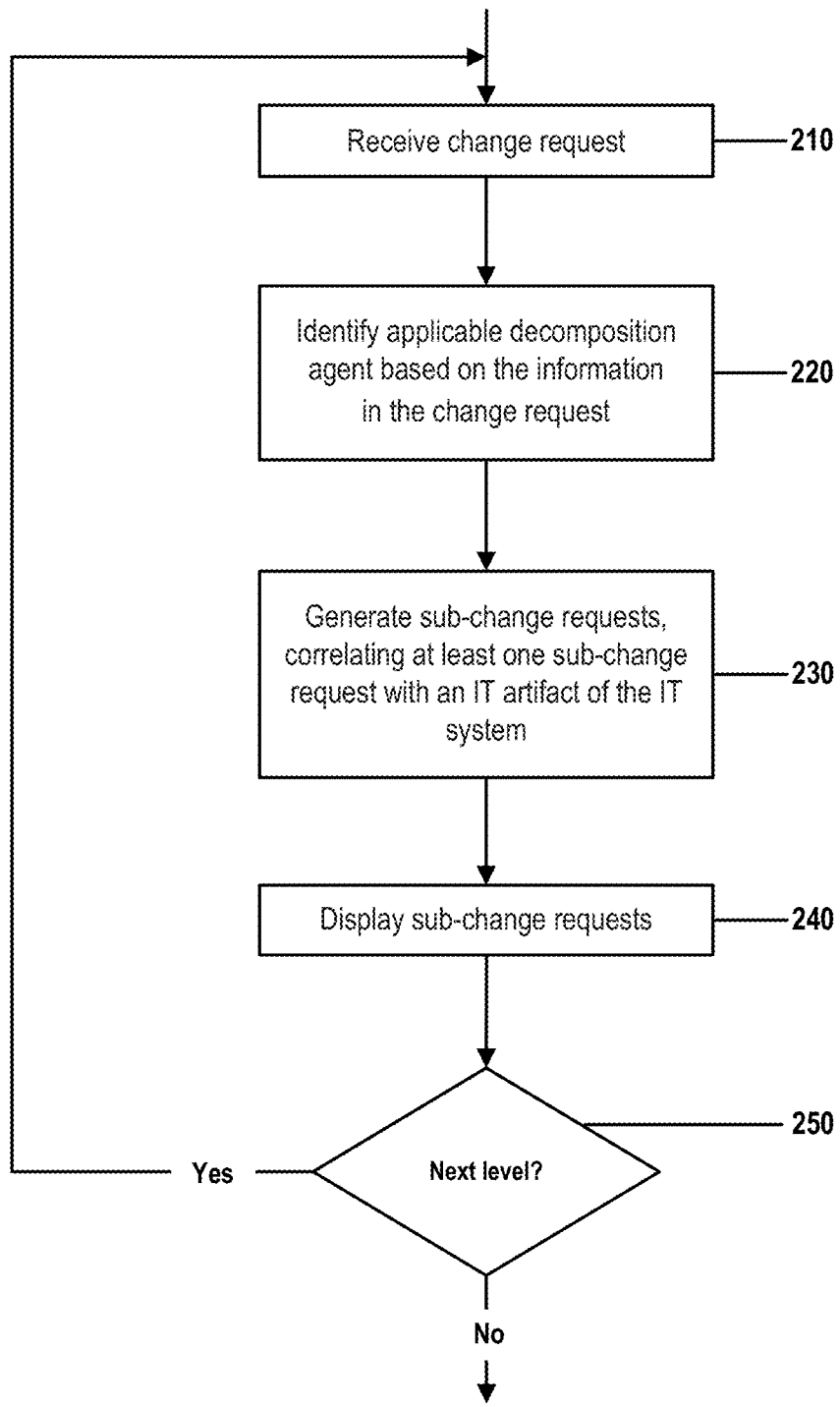
FIG. 2 is a flowchart of a method according to an embodiment of the invention.

FIG. 2 is a flowchart of a method according to an embodiment of the invention.

FIG. 2 shows a computer-aided method for the analysis of change request of a project involving an IT system, wherein the IT system comprises a plurality of IT artifacts having predefined relationships. The process of the method begins at step 210.

In step 210, one or more processors receive a change request.

FIG. 3 shows an example of a change request according to an embodiment of the invention.

The contents of the exemplary change request is shown as text of table 300. "CR1" in the first line is an identifier of the change request. Subsequent lines each show one parameter name and one corresponding parameter value that in aggregate represent the information comprised by the change request.

In the example of FIG. 3, the parameter names are shown in bold text and the parameter values in italicized text. The meaning of each parameter is self-explanatory to those skilled in the art, but a brief description of each parameter of this example is provided below in order to facilitate understanding of the invention and of this exemplary embodiment.

Parameter "CR_Objective" represents an objective of the change request and here defines a project task to be fulfilled in order to satisfy the change request. In this example, the objective of change request CR1 is "Integrate PRISM engine into POT". PRISM engine is a mathematical engine, and POT is an application (Portfolio Optimization Tool) already deployed in the project.

Parameter "CR_Change_object" represents a change object, that is, the entity to which the change request is directed. It may refer to either a particular entity or a class of entities, such as "System x's Database" or "Database." In this example, the change object is identified as a specific entity "application POT." In an other example, the value of the change object might be a specific application or class of application, such as "POT".

Parameter "CR_Change_type" represents a change type associated with change request CR1. A change type identifies a type of action required in order to perform the change request. In this example, the change type is "integration."

Parameter "CR_IT_context" represents an IT context associated with change request CR1, where an IT context identifies an IT artifact or a class of IT artifacts of the change object. In this example, the IT context is "application."

Parameter "CR_Demographics" identifies a set of feature data objects that describe characteristics of the change object and its environment. In this example, the feature data objects comprise parameters that identify the following components or characteristics of a target system and its environment:

"CR_Language": "Java";
"CR_Middleware": "Tomcat";
"CR_Database": "DB2"; and
"CR_Application_structure": "Browser-Server."

In this example, if change request CR1 300 identifies a change object as an object of type "POT", the IT context of change request CR1 might be represented as an entire "POT" hierarchical tree structure 301-336 of FIG. 3. This tree structure represents the IT structure of application POT, wherein each node of the tree represents an IT artifact and wherein a line between a parent node and its child node represents a decomposition relationship. In such a hierarchical structure, an IT artifact represented by a parent node comprised by structure 301-336 may be decomposed into one or more IT artifacts represented by one or more child nodes comprised by structure 301-336.

In the example of FIG. 3, an application POT 301 artifact may be decomposed into a second level of "Database" 311, "Services" 312 and "Web UI" (Web user interface) 313 artifacts.

Second-level artifacts, such as "Database" 311 might further be decomposed into third-level artifacts. Here, "Database" 311 may be decomposed into third-level-artifacts "Table" 321 and "Storage Procedure" 322. In a similar manner, second-level artifact "Web UI" 313 may be decomposed into component third-level artifacts "Servlet" 323, "JSP" (Java Server Pages) 324, "Config" (configuration) 325 and "HTML" 326.

This decomposition may continue through an arbitrary number of levels. For example, third-level artifact "Table" 321 comprises fourth-level artifacts "Table AAA" 331 and "Table BBB" 332; third-level artifact "Servlet" 323 comprises fourth-level artifacts "LoadPortfolioServlet" 333 and "GetOptimizationServlet" 334; third-level artifact "Config" 325 comprises fourth-level artifact "web.xml" 335; and third-level artifact "HTML" 326 comprises fourth-level artifact "mainView.html" 336.

The hierarchical structure of items 301-336 should not be construed to limit the forms or internal structure that may be comprised by a change object. In other examples and embodiments, a change object and a set of artifacts comprised by the change object may be represented, as a function of implementation-dependent factors, by an other type of hierarchical structure or by an other form of representation, such as a list, an array, or a linked list, or as an ordered or unordered set of unstructured data elements. In some embodiments, known methods of semantic analysis may allow such an unstructured data set to be organized into an equivalent structured form.

Returning to FIG. 2, if a predefined change request CR1 300 is stored in a database (not shown), the one or more processors may in step 210 retrieve or receive the predefined change request 300 from the database.

In other embodiments, the one or more processors may in step 210 receive a user-specified change request 300 by means of interactive or non-interactive user input. For example, if a user interface prompts a user to enter a change request 300 and enter an identifier (such as "CR1") of the change request 300.

In step 220, the one or more processors identify an applicable decomposition agent as a function of information comprised by the received change request 300.

In the context of the invention, a decomposition agent is a predefined computer-executable process or procedure for automatically decomposing a change request into multiple sub-change requests. As is known by those skilled in the art, change requests often occur during the process of project development. In the development of a project involving an IT system, many change requests may be similar in requesting similar types of tasks or in requesting procedures be performed upon similar types of entities.

A project-management professional may thus generally know how to decompose a change request based on acquired knowledge and experience with previous, similar change requests. Furthermore, a project-management professional may know that a change request should be decomposed in a manner generally similar to that in which similar change requests were decomposed in the current project or in one or more previous projects.

Based on this knowledge, a predefined decomposition agent may be defined in advance for dealing with one or more types or classes of change requests, as a function of expert knowledge of previous similar change requests or as a function of a prior prediction that future change requests may comprise certain characteristics or may be of a certain type or class.

For example, consider a case in which POT is a specific application with a known IT structure. If a change request associated with the project is received that requests performance of a task of integrating a computing tool into the POT application, a project manager may decompose this change request as a function of previously accumulated knowledge and experience related to previous decompositions of previous change requests that requested performance of a task of integrating a computing tool into an application.

In embodiments of the present invention, this previously accumulated knowledge may be used to create a predefined decomposition agent that comprises a general procedure for performing a specific type of requested task. In the current example, the processors, upon receiving a change request for integrating a computing tool into the POT application may identify one or more decomposition agents that share functions or other characteristics with the newly received change request.

In embodiments shown herein, the one or more processors in step 220 may identify characteristics of the change request received in step 210 and, as a function of those characteristics, automatically or partially automatically select one or more decomposition agents associated with those characteristics. These characteristics may comprise, but are not limited to, combinations of: a type or classification of a task (such as migrating an entity to a new environment, installing a new instance of a software application, or performing an upgrade), an entity or a type of entity affected by the requested change (such as a physical server, a disk array, or a virtual network), or a type of computing platform or operating environment.

FIG. 4 shows an example of a decomposition agent according to an embodiment of the invention. This example is shown as pseudocode for illustrative purposes, but should not be construed to imply that a decomposition agent must comprise software code of similar syntax or format, or comprised by instructions coded in a similar programming language.

The first line of the code of FIG. 4 comprises an identifier AGENT_001 that identifies the decomposition agent. Subsequent lines each identify a parameter of the decomposition agent and a value of that parameter, wherein each parameter name is shown in bold text and each parametric value is shown in italicized text. The self-explanatory meaning of each parameter would be clear to those skilled in the art, but in order to facilitate understanding of the invention, a brief description of a representative subset of the parameters is provided below.

Parameters of decomposition agent AGENT_001 listed in the example of FIG. 4 thus include: change object "AGT_Change_object", change type "AGT_Change_type", feature data "AGT_Demographics" and action set "AGT_Actions".

Parameter "AGT_Change_object" refers to an entity to be acted upon by a change request. It may refer to either a particular entity or to a class of entities. In this example, the change object that can be handled by change agent AGENT_001 is "application", which refers to a class of entities that comprise software applications.

Parameter "AGT_Change_type" refers to a type of requested change or a type of requested action required to fulfill the change request, such as "Migration" or "Integration", or "Uninstallation." Here, the change type associated with decomposition agent AGENT_001 is "Integration".

Parameter "AGT_Demographics" refers to feature data that describes characteristics of the change object and its environment. In this example, the meaning and component artifacts of parameter "AGT_Demographics" are analogous to those of parameter "CR_Demographics" of FIG. 3, so if this parameter is used to select decomposition agents, methods of the present invention might this select AGENT_001 of FIG. 4 in order to process received change request CR1 of FIG. 3.

Parameter "AGT_Actions" defines a set of actions supported by the decomposition agent. In this example, this action set comprises three actions. Their identifiers (identified by values of instances of parameter "AGT_Action_ID") are respectively "ACT_001_01", "ACT_001_02" and "ACT_001_03". Each action is further associated with the following parameters.

Parameter "AGT_Action_pattern": an action pattern that defines decomposition steps to be performed by the associated action. Each of these decomposition steps may generate one or more sub-change requests. An action pattern may, for example, indicate that user input shall be requested and received, or may identify a result generated from prior execution of a dependent or other action. Examples of a value of an action pattern comprise, but are not limited to: "Migrate existing tables" or "Delete old servlets.". In this example, an action pattern of action ACT_001_01 is "change the data table to support integration scenario"; an action pattern of action ACT_001_02 is "change to provide REST APIs"; and an action pattern of action ACT_001_03 is "change front-end to invoke REST APIs."

Parameter "AGT_IT_context" identifies an IT context, which is used to specify a particular IT artifact or a class IT artifacts associated with an action. If an action pattern is not related to any IT artifact at any level, the value of an associated IT context parameter may be null. In other cases, a value of the IT context parameter may contain a result generated by prior execution of a dependent action.

In the example of FIG. 4, IT contexts of actions ACT_001_01, ACT_001_02 and ACT_001_03 are, respectively, "Database", "Services" and "Web UI", respectively.

Parameter "AGT_Impact scope" identifies an impact scope, which is used to define a scope of an impact analysis. Such a scope may comprise one or more IT artifacts or one or more classes of IT artifacts. A result of such an impact analysis may comprise one or more of IT artifacts that may be affected by any change request generated by the associated action, or by any other change request generated for the IT artifact(s). In embodiments shown here, a default value of this parameter is a null value that identifies that an impact scope extends to an entire application. A value of this parameter may comprise a value generated from a prior execution of any dependent action.

Parameter "AGT_Sequence_No" identifies a sequence number of execution, which indicates an order of execution of actions comprised by an associated action set. This parameter may be initialized to a value of "0." If a first action in an action set may be performed independently of a second action of the action set, regardless of the order in which the two actions are performed, it is possible in some embodiments for the first action and the second action to have a same sequence number.

Parameter "Dependencies" refers to a set of actions upon which the current action is dependent. For example, if a first action "ACT_yyy_yy" depends upon a second action "ACT_xxx_xx", then the execution of the first action is dependent on the execution of the second action. That is, action "ACT_xxx_xx" must be performed before action "ACT_yyy_yy" can be performed. Because a relative order of execution of two actions may also be determined by corresponding "Sequence_No." values, some embodiments may not comprise or consider a "Dependencies" parameter.

Parameter "AGT_Assigned_Agent_ID" (or "AGT_Designated_Agent_ID") comprises a designated-agent identifier, which is an identifier of a decomposition agent designated for handling a generated sub-change request. In some embodiments, this parameter may be optional. For example, if a value of an instance of this parameter associated with a particular action is "AGENT_121", sub-change requests generated by that particular action may be suitable for further decomposition by a decomposition agent identified as "AGENT_121". In some embodiments, a null value of this parameter may indicate that a decomposition agent for the sub-change request may be identifiable by an automatic identification process.

Parameters of a predefined decomposition agent may each correspond to a data item comprised by an associated change request. In the example of FIG. 3 and FIG. 4, for example, parameters change object, change type, feature data, and IT context of change request CR1 may have corresponding or analogous parameters in the decomposition agent AGENT_001.

Returning to step 220 of FIG. 2, the one or more processors may query a database that stores one or more predefined decomposition agents in order to retrieve one or more stored decomposition agents that may be relevant to the change request received in step 210.

This querying may be performed as a function of information comprised by the change request. Such a function may comprise searching for decomposition agents that comprise values of one or more parameters that match, or are a function of, one or more parametric values or other elements of information comprised by the change request. In this manner, the one or more processors may identify one or more applicable decomposition agents suitable for automatic decomposition of the change request.

Ideally, if predefined decomposition agents are very comprehensive and the information contained in a change request is sufficiently detailed, the one or more processors in this step are likely to identify and retrieve an applicable decomposition agent for the change request received in step 210.

If, however, the information contained in the change request is inadequate, the one or more processors may instead in step 220 initiate an interactive mediation operation via human-machine interactions to receive user input so that an applicable decomposition agent may be identified.

In embodiments of step 220, different approaches may be taken to identify an applicable decomposition agent for the received change request. In one example, a received change request may comprise information that identifies change object CR_Change_object and change type CR_Change_type. In such a case, the one or more processors in step 220 may identify an applicable decomposition agent by:

i) retrieving at least one decomposition agent that comprises values of parameter change object AGT_Change_object and change type AGT_Change_type that match values of analogous parameters of the change request, wherein the retrieved at least one decomposition agent form a first set of candidate decomposition agents;

ii) selecting an applicable or a most applicable decomposition agent from the first set of candidate decomposition agents. If the first set of candidate decomposition agents only contains one decomposition agent, then the one decomposition agent may be selected as the applicable decomposition agent. If the first set of candidate decomposition agents contains multiple candidate decomposition agents, the applicable decomposition agent may be selected from the set by an automated or interactive method that may comprise, but is not limited to, interactive or noninteractive human input.

In one example, consider a case in which the one or more processors receive in step 210 the change request CR1 300 of FIG. 3. If the one or more processors query a database for an applicable decomposition agent by means of query terms that comprise a change-object value of "Application POT" and a change-type value of "integration," such a query will retrieve decomposition agent AGENT_001 shown in FIG. 4. The first set of candidate decomposition agents will this comprise decomposition agent AGENT_001 and, if no other stored decomposition agents match the query terms, the first set of candidate decomposition agents will this consist solely of decomposition agent AGENT_001.

In a further example, in which the information contained in a change request further comprises an IT context CR_IT_context, the one or more processors in step 220 may identify an applicable decomposition agent by:

i) identifying a second set of candidate decomposition agents by selecting from the first set of candidate decomposition agents at least one decomposition agent, where the at least one selected decomposition agent identifies a value of an IT context AGT_IT_context that is compatible with a value of IT context CR_IT_context comprised by the change request; and ii) selecting an applicable decomposition agent from the second set of candidate decomposition agents.

In this example an IT context of a decomposition agent may be deemed to be compatible with an IT context of a decomposition agent if a value of agent parameter AGT_IT_context is identical to a value of change request parameter CR_IT_context, or if a level of agent parameter AGT_IT_context is higher than a level of change request parameter CR_IT_context.

If the second set of candidate decomposition agents consists of only one decomposition agent, that one decomposition agent may be selected as an applicable decomposition agent. If the second set of candidate decomposition agents comprises multiple candidate decomposition agents, an applicable decomposition agent may be may be selected from the set by an automated or interactive method that may comprise, but is not limited to, interactive or noninteractive human input.

For example, if a value of parameter CR_IT_context of change agent CR1 300 is "Application," then values of parameter AGT_IT_contexts associated with each action comprised by decomposition agent AGENT_001 in the first candidate decomposition agents are respectively "Database," "Services," and "Web UI." The level of these parameters in the IT structure of the POT structure is lower than the level of the "Application" parameter. In this case, the second set of candidate decomposition agents would include decomposition agent AGENT_001.

In another embodiment, information contained in the change request further comprises feature data parameter CR_Demographics, and the selecting an applicable decomposition agent from the second set of candidate decomposition agents further comprises:

i) selecting a third set of candidate decomposition agents from the second set of candidate decomposition agents, where the third set comprises one or more decomposition agents that comprise values of the feature data parameter AGT_Demographics that are most compatible with the feature data CR_Demographics parameter of the change request; and ii) selecting an applicable decomposition agent from the third set of candidate decomposition agents.

If the third set of candidate decomposition agents contains only one decomposition agent, this decomposition agent may be selected as an only applicable decomposition agent. If the third set of candidate decomposition agents contains multiple candidate decomposition agents, an applicable decomposition agent may be selected from the set by an automated or interactive method that may comprise, but is not limited to, interactive or noninteractive human input.

In an example, a value "Java" of parameter AGT_Language and a value "Browser-Server" of decomposition-agent parameter AGT_Application_structure of feature data of AGENT_001 may respectively match values of parameter CR_Language and a value of parameter CR_Application_structure of the feature data of change request CR1. In this example, a value of parameter AGT_Database in the feature data of AGENT_001 is "Relational Database", and a value of parameter CR_Database in the feature data of CR1 is "DB2." Because DB2 is a kind of Relational Database, the feature data of AGENT_001 matches the feature data of CR1. In this case, the third candidate set of decomposition agent thus comprises AGENT_001.

In summary, decomposition agent AGENT_001 may be selected to deal with the decomposition of change request CR1.

According to another embodiment, selecting an applicable decomposition agent from a third set of candidate decomposition agents may further comprise:

i) prompting a user to input information missing from the feature data of the change request;

ii) receiving the information input by the user; and iii) supplementing the feature data of the change request with the received information.

In one example, because a business person is not familiar with IT systems, it is possible that feature data provided by him at a time of submitting a change request is not complete. Such a situation may exist during a process of selecting an applicable decomposition agent from the third set of candidate decomposition agents. If necessary, a human-machine interactive or noninteractive interface may be provided to receive information entered by a user (such as a change-management professional using an embodiment of the present invention implemented on a computer), to supplement the feature data CR_Demographics, and to then use the supplemented CR_Demographics to facilitate operations like selecting the applicable decomposition agent from the third set of candidate decomposition agents.

The above embodiments of step 220 described here are merely exemplary. As known by a person skilled in the art, an implementation of step 220 is dependent upon factors that may comprise, but are not limited to: whether pre-defined change agents are comprehensive; or whether parameters of change requests are accurate and complete. Embodiments of step 220, may comprise an appropriately tailored human-computer interaction process for receiving user input to supplement information missing from a change request, and may even modify a value of a parameter of a change request.

At the conclusion of step 220, the one or more processors will have selected a decomposition agent. In the examples above, agent Agent_001 is selected as an applicable decomposition agent for change request CR1.

In step 230, a plurality of sub-change requests are generated by the decomposition agent according to the change request, including the correlation of at least one sub-change requests of the plurality of sub-change requests and an IT artifact of the IT system.

As is known by those skilled in the art, a script of a predefined decomposition agent may be stored in a database (not shown). By invoking a script of a specific decomposition agent by the agent engine running on a computer, functions of the decomposition agent may be performed to decompose a change request into multiple sub-change requests.

Figure 5:
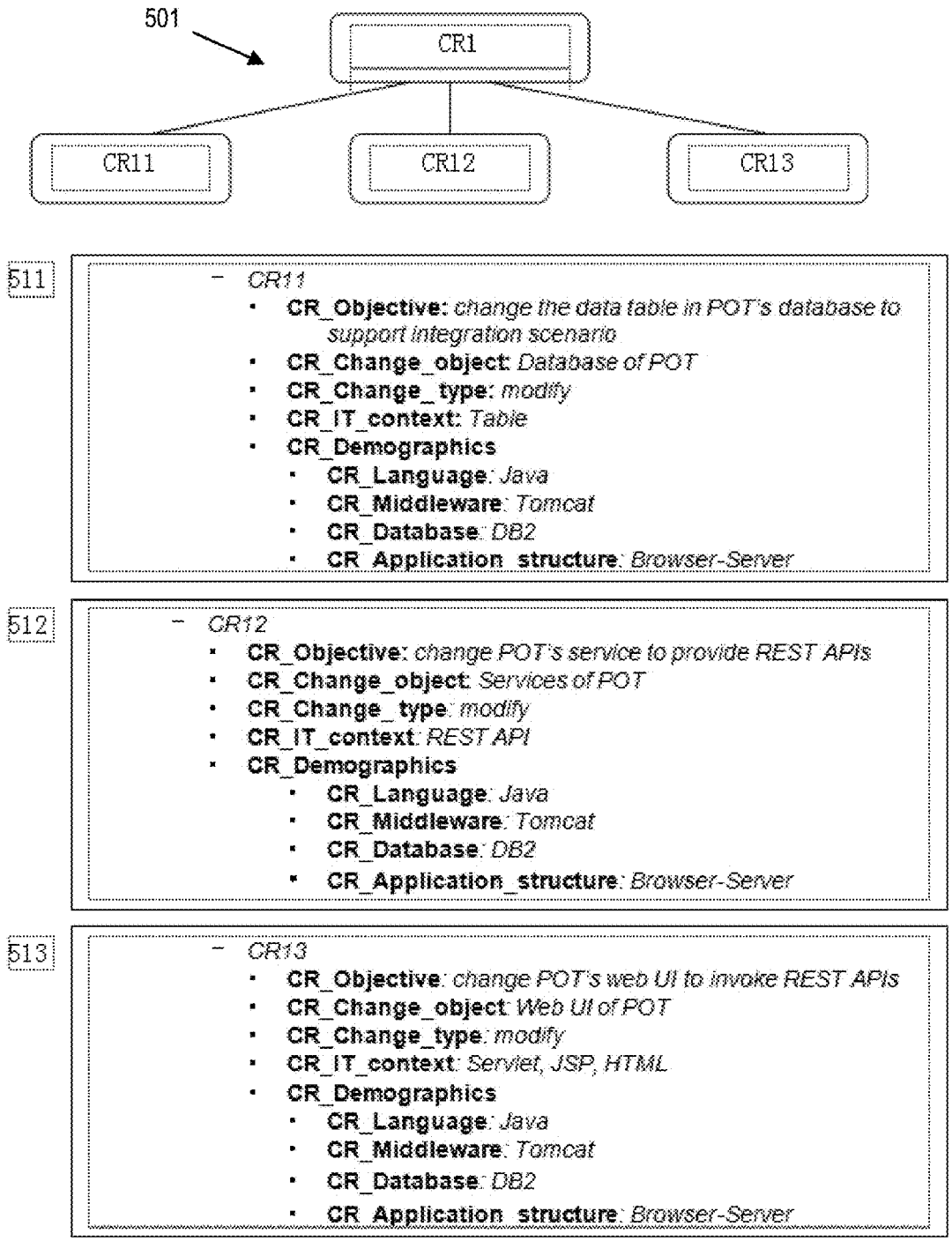
FIG. 5 shows a result generated by a decomposing agent in decomposing a change request according to embodiments of the invention.

In the example, in which decomposition agent AGENT_001 decomposes change request CR1_agent into a plurality of sub-change requests, AGENT_001 here, in accordance with sequence number AGT_Sequence_No., respectively performs action ACT_001_01 of which the sequence No. is "0", action ACT_001_02 of which the sequence No. is "1", and action ACT_001_03 of which the sequence No. is "2", and then decomposes change request CR1 300 into a plurality of sub-change requests CR11, CR12, and CR13, as shown in FIG. 5.

As shown in FIG. 4, the sequence numbers of each action comprised by AGENT_001 identify that action ACT_001_01 is performed first to create change request CR11.

In FIG. 5, two-level hierarchical structure 501 shows a structural relationship between change request CR1 sub-change requests CR11, CR12, and CR13.

Table 511 in FIG. 5 shows generated as a result of performing action ACT_001_01. Here, sub-change request CR11 comprises objective (CR_Objective): "change the data table in POT's database to support integration scenario"; change object (CR_Change_object): "database of POT"; change type (CR_Change_type): "modify"; IT context (CR_IT_context): "Table"; and feature data (CR_Demographics) including language (CR_Language): "Java"; middleware (CR_Middleware): "Tomcat"; database (Database): "DB2"; and application structure (CR_Application_structure): "Browser-Server".

Specifically, according to FIG. 4's action pattern ACT_001_01 (AGT_Action_pattern) "change the data table to support integration scenario" and change request CR1 300's change object (CR_Change_object) "application POT," CR11's objective (CR_objective) is derived to be "change the data table in POT's database to support integration scenario".

Similarly, according to an IT_context of ACT_001_01 (AGT_IT_context) "Database", change object of CR11 (CR_Change_object) is identified as "Database of POT." According to change pattern "change the data table to support integration", a change type of CR11 is identified to be "modify". According to "table" in change pattern (AGT_Action_pattern) "change the data table to support integration", an IT_context of CR11 (CR_IT_context) is determined to be "Table". Feature data CR_Demographics of CR11 is inherited from feature data CR_Demographics of CR1.

Similarly, action ACT_001_02 is performed to create change request CR12, shown in table 512 of FIG. 5.

According to action pattern "change to provide REST APIs" of ACT_001_02 and change object "application POT" of CR1, a change object of CR12 is identified as "change POT's service to provide REST APIs". According to IT_context "Services" of ACT_001_02, a change object of CR12 is determined to be "Service of POT". According to the action pattern, a change type of CR12 is determined to be "modify" and an IT context of CR12 is determined to be "REST API". Feature data CR_Demographics of CR12 is inherited from feature data CR_Demographics of CR1.

Finally, action ACT_001_03 is performed to generate change request CR13, shown in table 513 of FIG. 5.

According to action pattern "change front-end to invoke REST APIs" of and change object "application POT" of CR1, a change object of CR13 is identified as "change POT's web UI to invoke REST APIs". According to IT_context "Web UI" of ACT_001_03, a change object of CR13 is determined to be "Web UI of POT". According to action pattern of ACT_001_03, a change type of CR13 is identified as "modify," and an IT context of CR13 is identified as "Servlet, JSP, HTML". Feature data of CR13 is inherited from feature data of CR1.

As can be seen from tables 511, 512 and 513, when change requests CR11, CR12 and CR13 are generated, their correlations with corresponding IT artifacts of the IT system is also generated.

In step 240, the one or more processors display the sub-change requests to a user.

For example, sub-change requests generated as a result of the decomposition of change request CR1 by decomposition agent Agent_001, as described above, are as shown in the tree diagram in FIG. 5.

The upper portion of FIG. 5 shows a two-level hierarchical tree diagram 501. Node CR1 at the first level represents change request CR1 300, shown in FIG. 3. Nodes CR11, CR12, CR13 at the second level are children nodes of node CR1, and each represents a sub-change request respectively generated by an execution of actions ACT_001_01, ACT_001_02 and ACT_001_03, as described above.

The tree diagram 501 of FIG. 5 is only one of many possible formats or structures, known to those skilled in the art, that may be used to display sub-change requests. Relevant messages, such as information comprised by tables 511, 512 and 513, may also be shown by the interface. All such possible display forms, media, and formats are within the scope of the invention. The messages mentioned above are conducive to understanding the correlation of sub-change requests with IT artifacts by change request analysts and by project implementers and managers.

Thus, the generation of the plurality of sub-change requests by an applicable decomposition agent according to a received change request 300 comprises a generation of a correlation relationship of at least one of the plurality of change requests with an IT artifact of the system.

In step 250 of FIG. 2, the one or more processors determine whether to repeat the process of steps 210-240 to generate another level of sub-change requests.

If the one or more processors determine to repeat the process of steps 210-240, for example, the one or more processors may then, in the next iteration of step 210, select sub-change request CR13 change requests CR11, CR12 and CR13 as a change request to be decomposed.

In step 220, the one or more processors would then select an applicable decomposition agent as a function of information comprised by change request CR13.

FIG. 6, shows an embodiment of the present invention in which an other agent Agent_007 is shown. Because decomposition procedure identified by agent Agent_007 is similar to the procedure identified by decomposition agent Agent_001 as described above, procedure identified by agent Agent_007 is not repeated here.

Specifically, in relation to the decomposition agent Agent_007 shown in this figure, the one or more processors search is conducted for decomposition agent according to change object "Web UI of POT" and change type "modify" of CR13, and decomposition agent AGENT_007 shown in FIG. 6 is matched. IT contexts of all actions in AGENT_007 are respectively "Servlet", "JSP", and "HTML", which are the same as the IT contexts in CR13. Parameters AGT_Language and AGT_Application_structure in the feature data of AGENT_007 are same as corresponding parameters of CR13. So, it may be determined that AGENT_007 is the decomposition agent applicable for the decomposition of the sub-change request CR13.

In step 230, the decomposing agent Agent_007 decomposes change request CR13 into a plurality of sub-change requests, generating a correlation of at least one of the sub-change requests with an IT artifact of the IT system. The result of this process is shown in FIG. 7.

Figure 7:
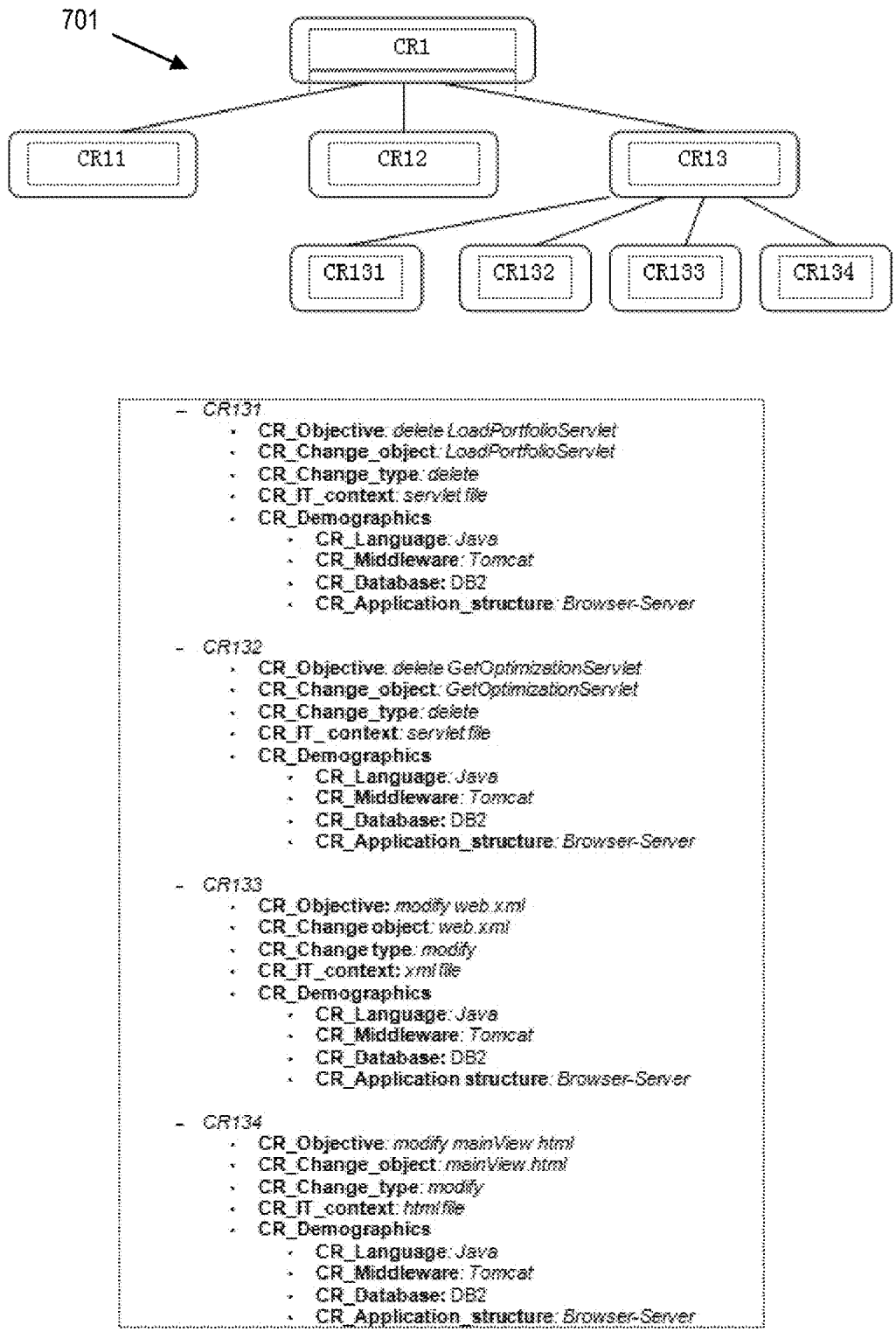
FIG. 7 shows a result generated by an decomposing agent that decomposes a sub-change request according to an embodiment of the invention.

FIG. 7 shows a result generated by decomposing agent Agent_007 of FIG. 6 by decomposing sub-change request CR13. This result comprises a three-level hierarchical tree structure 701 that includes a third level of four sub-change requests of CR13 labeled CR131-134. This process of decomposing sub-change request CR13 is similar to the process of decomposing change request CR1 described above.

Specifically, according to values of parameter AGT_Sequence_No., which associates a sequence number with each action of the individual actions of AGENT_007, action ACT_007_01 is performed first. Based on the action pattern and IT context of ACT_007_01, the one or more processors here identify two Servlet files, "LoadPortfolioServlet" and "GetOptimizationServlet." Therefore, two change requests CR131 and CR132 are created.

Specifically, according to action pattern "delete old servlets" of ACT_007_01 and change object "LoadPortfolioServlet" of CR1 300, the one or more processors identify objective "delete LoadPortfolioServlet" of CR131. Change_object of CR131 is further identified as "LoadPortfolioServlet," based on Servlet file "LoadPortfolioServlet" mentioned above. A change type of CR131 is further identified as "delete," according to the action pattern. IT context of CR131 is identified as "Servlet file," according to the action pattern. And finally, feature data of CR131 is inherited from feature data of CR13.

Change request CR132 as shown in FIG. 7 is generated according to ACT_007_01 by a similar method, which is not repeated in detail here.

Similarly, by executing action ACT_007_02 of decomposition agent AGENT_007, shown in FIG. 6, the one or more processors may generate the sub-change request CR133 shown in FIG. 7. And, similarly, by executing action ACT_007_03 of decomposition agent AGENT_007, change request CR134 can be generated. Detailed descriptions of these very similar generating procedures are not repeated here.

The tree diagram 701 of FIG. 7 shows the resulting sub-change request CR131, CR132, CR133 and CR134.

The above examples show that, because a generated sub-object change request (e.g., CR13) includes complete information about a change object, a change type, a feature data, and an IT context, it is possible to identify an applicable decomposition agent (e.g., Agent_007) for further decomposing the sub-change request through automatic means. In this way, the process of steps 210-240 may be performed iteratively, level by level, for each level of sub-change requests.

Embodiments of the computer-aided method for the analysis of change request of a project involving an IT system are described by way of example above. It is noted that, in the specification, descriptions of change request and decomposition agent are provided. However, such descriptions are merely exemplary in nature, and do not limit the scope of the invention. As known by those skilled in the art, descriptions of a change request and a decomposition agent may take various formats, and the amount of information comprised by such representations may vary in scope, number, or structure. For example, Agent_001 and Agent_007, as described in the figures and examples herein, are two distinct decomposition agents. However, in practical implementations, the two decomposition agents may be integrated into one decomposition agent and, by appropriate programming, a resulting combined decomposition agent formed by the integration may be able to perform functions of both the Agent_001 and Agent_007 decomposition agents.

The various embodiments implementing the method of the present invention have been described above with reference to the accompanying drawings. Those skilled in the art may understand that the method may be implemented in software, hardware or a combination of software and hardware. Moreover, those skilled in the art may understand by implementing various steps in the above method in software, hardware or a combination of software and hardware, there may be provided an apparatus for the analysis of change request of a project involving an IT system based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding steps. Upon reading this specification, those skilled in the art may understand how to write a program for implementing actions performed by these means or modules.

Figure 8:
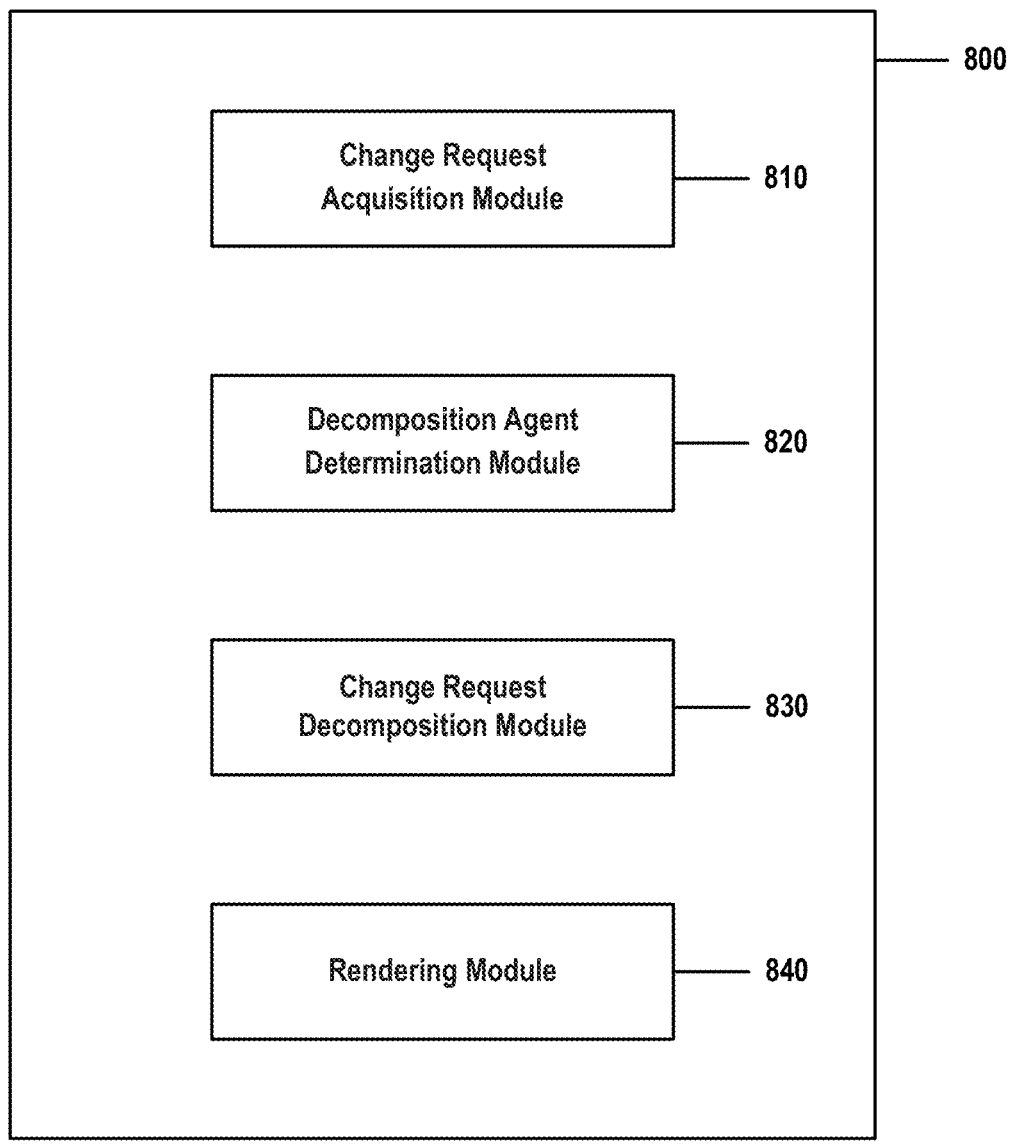
FIG. 8 is a block diagram of an apparatus according to an embodiment of the invention.

FIG. 8 is a structural drawing of an apparatus 800 for the analysis of a change request of a project involving an IT system according to an embodiment of the invention, wherein the system comprises a plurality of IT artifact predefined relationship.

As shown in FIG. 8, apparatus 800 comprises a change request acquisition module 810, a decomposition agent determination module 820, a change request decomposition module 830 and a rendering module 840.

The change request acquisition module 810 is configured to obtain a change request.

The decomposition agent determination module 820 is configured to select, identify, or otherwise determine an applicable decomposition agent based on the information contained in the change request.

The change request decomposition module 830 is configured to generate a plurality of sub-change requests comprised by the applicable decomposition agent selected, identified, or otherwise determined by decomposition agent determination module 820, wherein at least one of the plurality of sub-change requests is correlated with at least one of the plurality of IT artifacts.

The rendering module 840 is configured to display the plurality of sub-change requests generated by the change request decomposition module 830.

In some embodiments, information contained in a change request 300 identifies a value of a change object parameter associated with the change request and a value of a change type parameter associated with the change request. In such embodiments, the change request acquisition module 810 comprises:

a module configured to retrieve an at least one decomposition agent that each comprise a value of a change object and a value of a change type that match or otherwise correspond to the values of the change object of the change request and the change type of the change request, wherein the module retrieves the at least one decomposition agent from a database having predefined decomposition agents stored therein, and wherein the retrieved at least one decomposition agents form a first set of candidate decomposition agents; and a module configured to select an applicable decomposition agent from the first set of candidate decomposition agents.

In some embodiments, information contained in a change request 300 further comprises a value of an IT context parameter, and the module 820 configured to select the applicable decomposition agent from the first set of candidate decomposition agents further comprises:

a module configured to select from the first set of candidate decomposition agents a second set of at least one decomposition agents that each comprise a value of the IT context parameter that matches or otherwise corresponds to the value of the IT context parameter of the change request, wherein the retrieved second set of at least one decomposition agents forms a second set of candidate decomposition agents; and a module configured to select the applicable decomposition agent from the second set of candidate decomposition agents.

In embodiments wherein information contained in a change request 300 further comprises feature data, module 820 may be configured to select an applicable decomposition agent from the second set of candidate decomposition agents by steps by further comprising:

a module configured select from the second set of candidate decomposition agents a third set of one or more decomposition agents that each comprise feature data that matches, corresponds, or is most compatible with the feature data comprised by the change request 300, wherein the third set of one or more decomposition agents forms a third set of candidate decomposition agents; and a module configured to select the applicable decomposition agent from the third set of candidate decomposition agents.

In some embodiments, module 820 configured to select an applicable decomposition agent from the third set of candidate decomposition agents further comprises:

a module configured to prompt the user to enter information missing from the feature data of the change request 300;

a module configure to receive the information input by the user; and a module configured to supplement the feature data comprised by the change request 300 with the information received.

In some embodiments, the change request decomposition module 830 is configured to generate the following correlation information for the plurality of sub-change requests identified by module 820: change object; change type; feature data; and IT context.

In some embodiments, the change request acquisition module 810 is configured to select a sub-change request from the plurality of sub-change requests decomposed by a selected applicable decomposition agent.

In some embodiments, the change request acquisition module 810 is configured to read a predefined change request 300 from a database that stores one or more predefined change requests.

In some embodiments, the change request acquisition module 810 is configured to receive a change request input by the user.

Embodiments of the apparatus 800 for the analysis of a change request 300 of a project involving an IT system are described above. In the description of the embodiments of such an apparatus 800, details that are repetitive or derivable from an other description herein of an embodiment of the method for the analysis of change request of a project involving an IT system are omitted.

The flowchart and block diagrams in the Figures illustrate the architecture, functionality, and operation of possible implementations of systems, methods and computer program products according to various embodiments of the present invention. In this regard, each block in a flowchart or block diagram may represent a module, segment, or portion of code, which comprises one or more executable instructions for implementing the specified logical function(s).

In some alternative implementations, functions noted in a block may occur out of the order noted in the figures. For example, two blocks illustrated in succession may, in fact, be executed substantially concurrently, or the blocks may sometimes be executed in the reverse order, depending upon the functionality involved. Furthermore, each block of the block diagrams and/or flowchart illustrations, and combinations thereof, may be implemented by special-purpose hardware-based systems that perform the specified functions or acts, or by combinations of such special-purpose hardware and computer instructions.

The descriptions of the various embodiments of the present invention have been presented for purposes of illustration, but are not intended to be exhaustive or to limit the invention to embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for analyzing a change request of a project involving an IT system, wherein the IT system comprises a plurality of IT artifacts, the method comprising:

one or more processors receiving a change request that requests a performance of a task associated with the project, wherein the change request comprises values of a set of parameters that each describe a characteristic of the change request;

the one or more processors selecting an applicable decomposition agent from a plurality of decomposition agents as a function of the values of the set of parameters comprised by the change request,
wherein the applicable decomposition agent contains information necessary for the one or more processors to decompose the received change request into a set of sub-requests,
wherein each agent of the plurality of decomposition agents is a predefined computer-executable process configured to automatically decompose a specific class of change request into multiple sub-change requests, but does not itself perform tasks that satisfy the sub-change requests,
wherein the selection is performed as a function of parameters, of the set of parameters, that consist of an identification that the change request requests an installation of a new instance of a software application on a particular type of computing platform,
wherein each decomposition agent of the plurality of decomposition agents is adapted to satisfy one distinct class of change request,
wherein the one distinct class of change request is selected from the group consisting of migrating a computerized entity to a new environment, installing a new instance of a software application, or performing a software upgrade, and
wherein the applicable decomposition agent is an agent of the plurality of decomposition agents that is best adapted to satisfy a class of change requests that comprises the received change request;

the one or more processors generating the set of sub-change requests as a function of the information contained by the applicable decomposition agent; and the one or more processors identifying a correlation between at least one sub-change request of the plurality of sub-change requests and one IT artifact of the plurality of IT artifacts.

2. The method of claim 1, wherein the information contained in the change request comprises a value of a change object parameter and a value of a change type parameter, wherein the selecting an applicable decomposition agent further comprises:

the one or more processors retrieving one or more candidate decomposition agents of the plurality of decomposition agents, wherein the retrieved one or more candidate decomposition agents each comprise a value of the change object parameter that matches the value of the change object parameter comprised by the change request, wherein the retrieved one or more candidate decomposition agents each comprise a value of the change type parameter that matches the value of the change type parameter comprised by the change request, wherein the one or more candidate decomposition agents are retrieved from a database that stores one or more predefined decomposition agents, and wherein the one or more candidate decomposition agents form a first set of candidate decomposition agents; and the one or more processors selecting the applicable decomposition agent from the first set of candidate decomposition agents.

3. The method of claim 2, wherein the information comprised by the change request further comprises a value of an IT context parameter, and wherein the selecting the applicable decomposition agent from the first set of candidate decomposition agents further comprises:

the one or more processors selecting from the first set of candidate decomposition agents at least one candidate decomposition agents of the plurality of decomposition agents, wherein the at least one candidate decomposition agents each comprise a value of the IT context parameter that is compatible with the value of the IT context parameter comprised by the change request, and wherein the one or more candidate decomposition agents form a second set of candidate decomposition agents; and the one or more processors selecting the applicable decomposition agent from the second set of candidate decomposition agents.

4. The method of claim 3, wherein the information comprised by the change request further comprises a value of a feature data parameter, and wherein the selecting the applicable decomposition agent from the second set of candidate decomposition agents further comprises:

the one or more processors selecting from the second set of candidate decomposition agents a subset of decomposition agents of the plurality of decomposition agents, wherein each decomposition agent of the subset of decomposition agents comprises a value of the feature data parameter that is most compatible with the value of the feature data parameter comprised by the change request, and wherein the subset of decomposition agents forms a third set of candidate decomposition agents; and the one or more processors selecting the applicable decomposition agent from the third set of candidate decomposition agents.

5. The method of claim 4, wherein the selecting the applicable decomposition agent from the third set of candidate decomposition agents further comprises:

the one or more processors prompting a user to enter supplemental feature data not identified by the value of the feature data parameter comprised by the change request;

the one or more processors receiving the supplemental information; and the one or more processors supplementing the feature data of the change request with the received supplemental information.

6. The method of claim 1, wherein the generating the set of sub-change requests as a function of the information contained by the applicable decomposition agent comprises:

the one or more processors identifying a correlation between information comprised by at least one of the plurality of sub-change requests and a correlated value comprised by the change request, wherein the correlated value is a value of a parameter selected from a group comprising:

change object, change type, feature data, and IT context.

7. The method of claim 1, wherein receiving a change request comprises selecting a sub-change request that was previously decomposed by the applicable decomposition agent.

8. The method of claim 6, wherein said receiving a change request comprises selecting one sub-change request from the plurality of sub-change requests decomposed by the decomposition agent.

9. The method of claim 1, further comprising:

the one or more processors displaying the set of sub-change requests.

10. The method of claim 1, further comprising providing at least one support service for at least one of creating, integrating, hosting, maintaining, and deploying computer-readable program code in the computer system, wherein the computer-readable program code in combination with the computer system is configured to implement the receiving, selecting, generating and identifying.

11. A computer program product, comprising a computer-readable storage medium having a computer-readable program code stored therein, said program code configured to be executed by one or more processors of a computer system to implement a method for analyzing a change request of a project involving an IT system, wherein the IT system comprising a plurality of IT artifacts, the method comprising:

the one or more processors receiving a change request that requests a performance of a task associated with the project, wherein the change request comprises values of a set of parameters that each describe a characteristic of the change request;

the one or more processors selecting an applicable decomposition agent from a plurality of decomposition agents as a function of the values of the set of parameters comprised by the change request, wherein the applicable decomposition agent contains information necessary for the one or more processors to decompose the received change request into a set of sub-requests, wherein each agent of the plurality of decomposition agents is a predefined computer-executable process configured to automatically decompose a specific class of change request into multiple sub-change requests, but does not itself perform tasks that satisfy the sub-change requests, wherein the selection is performed as a function of parameters, of the set of parameters, that consist of an identification that the change request requests an installation of a new instance of a software application on a particular type of computing platform, wherein each decomposition agent of the plurality of decomposition agents is adapted to satisfy one distinct class of change request, wherein the one distinct class of change request is selected from the group consisting of migrating a computerized entity to a new environment, installing a new instance of a software application, or performing a software upgrade, and wherein the applicable decomposition agent is an agent of the plurality of decomposition agents that is best adapted to satisfy a class of change requests that comprises the received change request;

the one or more processors generating the set of sub-change requests as a function of the information contained by the applicable decomposition agent; and the one or more processors identifying a correlation between at least one sub-change request of the plurality of sub-change requests and one IT artifact of the plurality of IT artifacts.

12. The computer program product of claim 11, wherein the information contained in the change request comprises a value of a change object parameter and a value of a change type parameter, wherein the selecting an applicable decomposition agent further comprises:

the one or more processors retrieving one or more candidate decomposition agents of the plurality of decomposition agents, wherein the retrieved one or more candidate decomposition agents each comprise a value of the change object parameter that matches the value of the change object parameter comprised by the change request, wherein the retrieved one or more candidate decomposition agents each comprise a value of the change type parameter that matches the value of the change type parameter comprised by the change request, wherein the one or more candidate decomposition agents are retrieved from a database that stores one or more predefined decomposition agents, and wherein the one or more candidate decomposition agents form a first set of candidate decomposition agents; and the one or more processors selecting the applicable decomposition agent from the first set of candidate decomposition agents.

13. The computer program product of claim 12, wherein the selecting the applicable decomposition agent from the third set of candidate decomposition agents further comprises:

the one or more processors prompting a user to enter supplemental feature data not identified by the value of the feature data parameter comprised by the change request;

the one or more processors receiving the supplemental information; and the one or more processors supplementing the feature data of the change request with the received supplemental information.

14. The computer program product of claim 11, wherein the generating the set of sub-change requests as a function of the information contained by the applicable decomposition agent comprises:

the one or more processors identifying a correlation between information comprised by at least one of the plurality of sub-change requests and a correlated value comprised by the change request, wherein the correlated value is a value of a parameter selected from a group comprising:

change object, change type, feature data, and IT context.

15. The computer program product of claim 11, further comprising:

the one or more processors displaying the set of sub-change requests.

16. A computer system comprising one or more processors, a memory coupled to said processor, and a computer-readable hardware storage medium coupled to the one or more processors, said storage device containing program code configured to be run by said processor via the memory to implement a method for analyzing a change request of a project involving an IT system, wherein the IT system comprising a plurality of IT artifacts, the method comprising:

the one or more processors receiving a change request that requests a performance of a task associated with the project, wherein the change request comprises values of a set of parameters that each describe a characteristic of the change request;

the one or more processors selecting an applicable decomposition agent from a plurality of decomposition agents as a function of the values of the set of parameters comprised by the change request, wherein the applicable decomposition agent contains information necessary for the one or more processors to decompose the received change request into a set of sub-requests, wherein each agent of the plurality of decomposition agents is a predefined computer-executable process configured to automatically decompose a specific class of change request into multiple sub-change requests, but does not itself perform tasks that satisfy the sub-change requests, wherein the selection is performed as a function of parameters, of the set of parameters, that consist of an identification that the change request requests an installation of a new instance of a software application on a particular type of computing platform, wherein each decomposition agent of the plurality of decomposition agents is adapted to satisfy one distinct class of change request, wherein the one distinct class of change request is selected from the group consisting of migrating a computerized entity to a new environment, installing a new instance of a software application, or performing a software upgrade, and wherein the applicable decomposition agent is an agent of the plurality of decomposition agents that is best adapted to satisfy a class of change requests that comprises the received change request;

the one or more processors generating the set of sub-change requests as a function of the information contained by the applicable decomposition agent; and the one or more processors identifying a correlation between at least one sub-change request of the plurality of sub-change requests and one IT artifact of the plurality of IT artifacts.

17. The computer system of claim 16, wherein the information contained in the change request comprises a value of a change object parameter and a value of a change type parameter, wherein the selecting an applicable decomposition agent further comprises:

the one or more processors retrieving one or more candidate decomposition agents of the plurality of decomposition agents,
wherein the retrieved one or more candidate decomposition agents each comprise a value of the change object parameter that matches the value of the change object parameter comprised by the change request,
wherein the retrieved one or more candidate decomposition agents each comprise a value of the change type parameter that matches the value of the change type parameter comprised by the change request,
wherein the one or more candidate decomposition agents are retrieved from a database that stores one or more predefined decomposition agents, and
wherein the one or more candidate decomposition agents form a first set of candidate decomposition agents; and
the one or more processors selecting the applicable decomposition agent from the first set of candidate decomposition agents.

18. The computer system of claim 17, wherein the selecting the applicable decomposition agent from the third set of candidate decomposition agents further comprises:

the one or more processors prompting a user to enter supplemental feature data not identified by the value of the feature data parameter comprised by the change request;
the one or more processors receiving the supplemental information; and
the one or more processors supplementing the feature data of the change request with the received supplemental information.

19. The computer system of claim 16, wherein the generating the set of sub-change requests as a function of the information contained by the applicable decomposition agent comprises:

the one or more processors identifying a correlation between information comprised by at least one of the plurality of sub-change requests and a correlated value comprised by the change request, wherein the correlated value is a value of a parameter selected from a group comprising:

change object, change type, feature data, and IT context.

20. The computer system of claim 16, further comprising:

the one or more processors displaying the set of sub-change requests.

* * * * *